United States Patent [19]

Yeary et al.

[11] Patent Number: 4,832,544
[45] Date of Patent: May 23, 1989

[54] MILLING MACHINE

[75] Inventors: Robert L. Yeary, Mitchell; Larry J. Parkes; Norbert M. Fuhs, both of Bedford, all of Ind.

[73] Assignee: General Motors Corporation, Detroit, Mich.

[21] Appl. No.: 112,500

[22] Filed: Oct. 22, 1987

[51] Int. Cl.[4] .................................................. B23C 9/00
[52] U.S. Cl. .................................... 409/158; 409/149; 409/162
[58] Field of Search ............... 409/134, 145, 146, 147, 409/149, 155, 160, 162, 225, 226, 227, 228, 158

[56] References Cited

U.S. PATENT DOCUMENTS

| | | | |
|---|---|---|---|
| 2,694,960 | 11/1954 | Kahle et al. | 409/149 X |
| 4,362,196 | 12/1982 | Ferdinand et al. | 409/134 X |
| 4,536,112 | 8/1985 | Horsky et al. | 409/134 |
| 4,664,571 | 5/1987 | Takada et al. | 409/134 |

Primary Examiner—William L. Sikes
Assistant Examiner—Frank González
Attorney, Agent, or Firm—Ernest E. Helms

[57] ABSTRACT

The present invention provides an improved piston milling machine. The invention milling machine in a preferred embodiment incorporates a breakaway lift arm whereupon a workpiece caught in the machinery will not damage the lift arm assemblies of the machine. Any excessive loads causing the lift arm to break away will further signal the milling machine to cease operations.

5 Claims, 2 Drawing Sheets

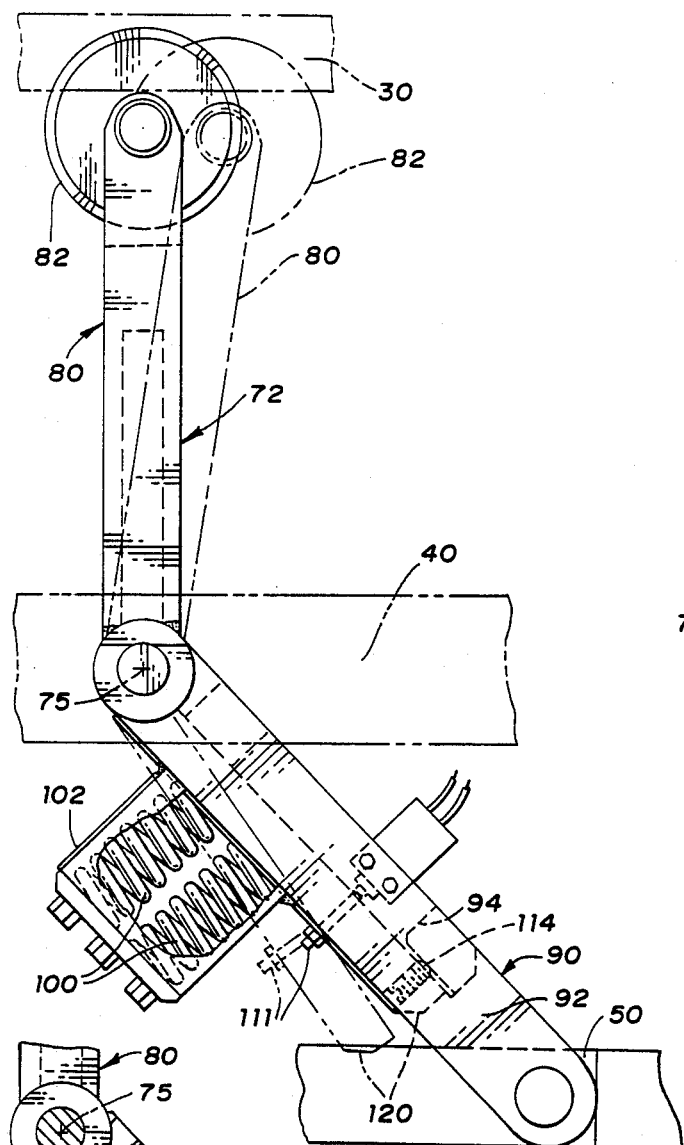
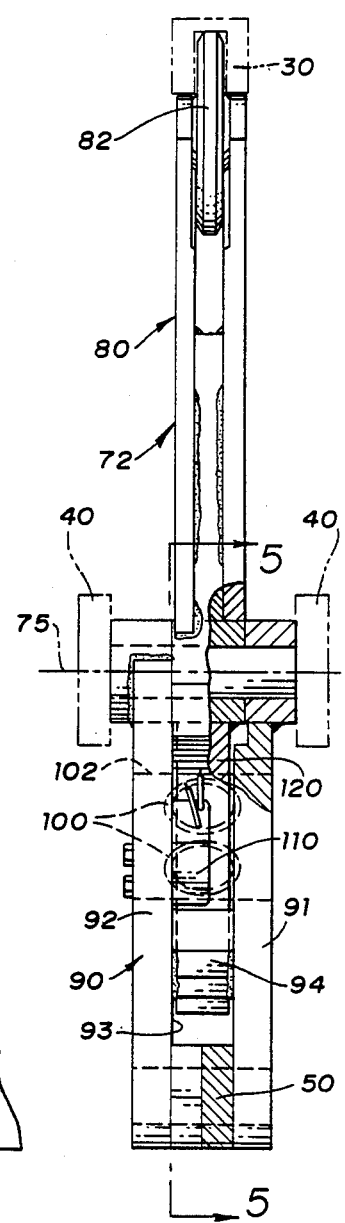
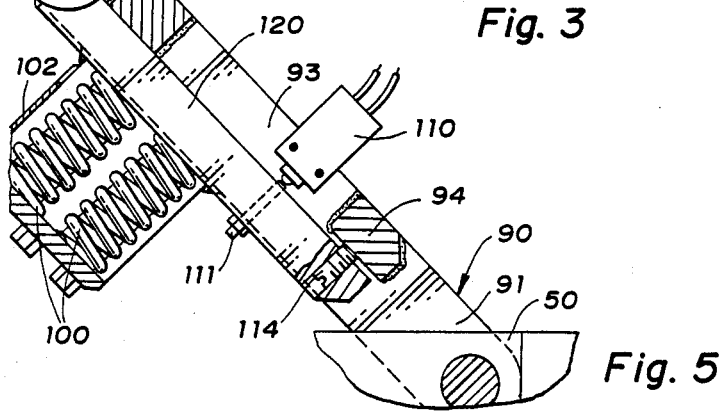
Fig. 3
Fig. 4
Fig. 5

MILLING MACHINE

FIELD OF THE INVENTION

The field of the present invention is that of milling machines for automotive pistons. More particularly, the field of the present invention is that of automotive piston milling machines having multiple tandem work stations.

DISCLOSURE STATEMENT

It is known in the art to provide a milling machine to remove excess material and the flasks from automotive piston castings.

A typical milling machine has an elongated transfer bar. The transfer bar receives the pistons and transfers them through a line of tandem orientated milling stations which perform various operations on the pistons.

Underneath the transfer bar and generally running parallel thereto is a frame. Located generally underneath the frame and generally parallel thereto is a drive bar. During various stages of operations, it is necessary to move pistons from one machining station to another machining station. It is also necessary to elevate them to the level of the rotating tool heads of the work station.

To accomplish the above, along a plurality of positions, lift arms are pivotally connected to the frame and drive bar. Typically the end of the lift arm that is adjacent to the transfer bar will have a roller. To lift the transfer bar, the drive bar will be driven in a projected arc causing the lift arms to lift up the transfer bar. To lower the transfer bar, the drive bar will be moved in an opposite direction.

Unfortunately, during the operation of the milling machine, the workpiece (piston) can sometimes be improperly located on a transfer bar or fall out from its proper position. The above can cause a jamming of the transfer bar. The jamming of the transfer bar will cause an excessive force to resist upward travel of the transfer bar. The above can cause a bending of the lift arm. Replacement of a damaged lift arm requires a substantial amount of time.

SUMMARY OF THE INVENTION

To overcome the above noted and other problems, the present invention is brought forth. The present invention provides a multiple piston milling machine. The preferred embodiment of the present invention possesses a lift arm which can break away to prevent excessive overloading. The preferred embodiment of the present invention also has an indicator to signal for the deactivation of the machine upon the occurrence of the overload.

It is an object of the present invention to provide a multiple piston milling machine with a breakaway lift arm.

It is another object of the present invention to provide an improved multiple piston milling machine with a plurality of work stations in tandem with one another, each said station having a plurality of rotating milling tool heads with rotative axes parallel with one another, the machine including an elongated transfer bar with a primary axis generally perpendicular to the axes of the tool heads for accepting a plurality of the pistons, the transfer bar being movable along the primary axis of the transfer bar, frame means generally parallel with the transfer bar underneath the transfer bar and being fixed with respect to the work stations, a drive bar generally parallel with the transfer bar and underneath the frame means, the drive bar having selective movement along a projected arc, and a lift arm, the lift arm including, an upper portion relatively contacting and supporting the transfer bar and the upper portion being pivotally connected along a first axis with the frame, a lower portion pivotally connected with the drive bar and pivotally connected with the frame means coaxially along the first axis, and a stud arm pivotally connected with the frame means coaxially along the first axis, the stud arm being fixedly connected with one of the upper or lower portions and being spring biased into contact with the other of the upper or lower portions whereby movement of the drive bar in a given direction causes the upper portion to elevate the transfer bar unless an excessive force restrains upward travel of the transfer bar whereupon the stud arm moves away from the other portion allowing the upper end lower portions to rotate towards one another.

It is yet another object of the present invention to provide an improved multiple piston milling machine with a plurality of work stations in tandem with one another, each work station having a plurality of rotative milling tool heads with rotative axes parallel to one another, the machine including, an elongated transfer bar with a primary axis generally perpendicular to the axes of the tool heads, the transfer bar accepting a plurality of the pistons, the transfer bar being movable along the primary axis of the transfer bar, an elongated frame generally parallel with the transfer bar underneath the transfer bar and being fixed with respect to the work stations, a drive bar generally parallel with the transfer bar underneath the frame, and the drive bar having selective movement along a projected arc, and at least two lift arms, each said lift arm including an upper portion having along one end a rotatively mounted roller for supporting the transfer bar and the upper portion being pivotally connected with the frame along a first axis and having a fixably connected stud arm projecting away from the first pivotal axis generally underneath the frame, a lower portion pivotally connected with the drive bar and pivotally connected with the frame coaxially with the first axis, the lower portion having a central slot for reception of the stud arm and having attached thereto indicator means for detecting the location of the stud arm with relationship to the lower portion, adjustable stop means for setting the position of the stud arm in relationship to the lower portion, and biasing springs connected with the lower portion urging the stud arm into a position of contact with the lower portion whereby movement of the drive bar at or under a 1 "g" acceleration in a given direction causes the upper portion to elevate the transfer bar unless an excessive force restrains upper travel of the transfer bar whereupon the stud arm moves away from the lower portion allowing the upper and lower portions to rotate towards one another and to activate the indicator means to signal for the cessation of operation of the milling machine.

Other objects, desires and advantages of the present invention will become more apparent to those skilled in the art as the nature of the invention is better understood from the accompanying drawings and a detailed description.

BRIEF DESCRIPTION OF THE DRAWINGS

FIG. 3 is an enlarged view of the lift arm shown in FIG. 2;

FIG. 4 is a sectional view mainly in side elevation of the lift arm shown in FIG. 3;

FIG. 5 is a view taken along line 5—5 of FIG. 4.

DETAILED DESCRIPTION OF THE DRAWINGS

Figure 1:
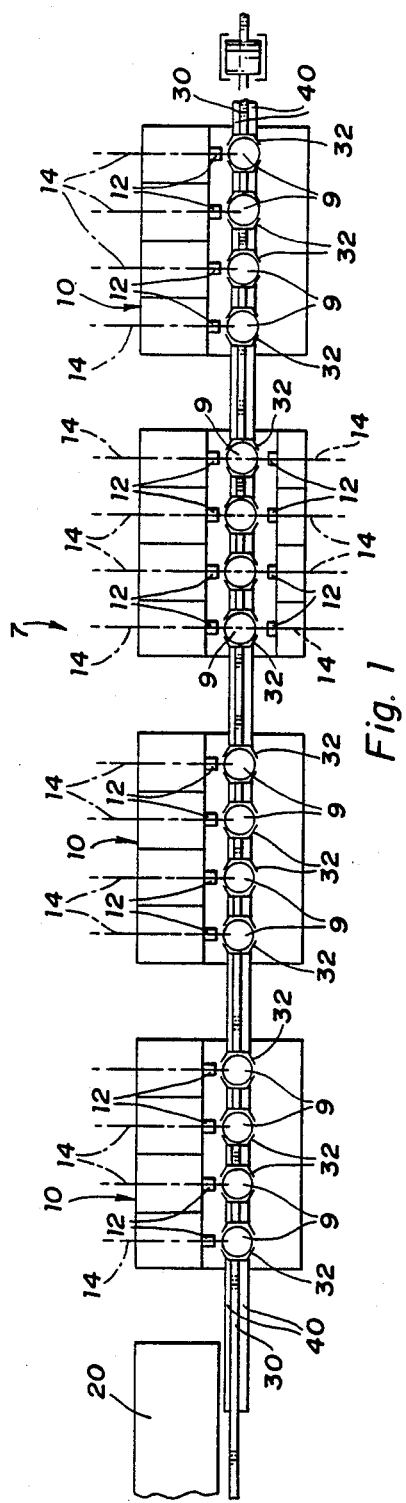
FIGS. 1 and 2 are top and front schematic views of a preferred embodiment improved multiple piston head milling machine according to the present invention.
Figure 2:
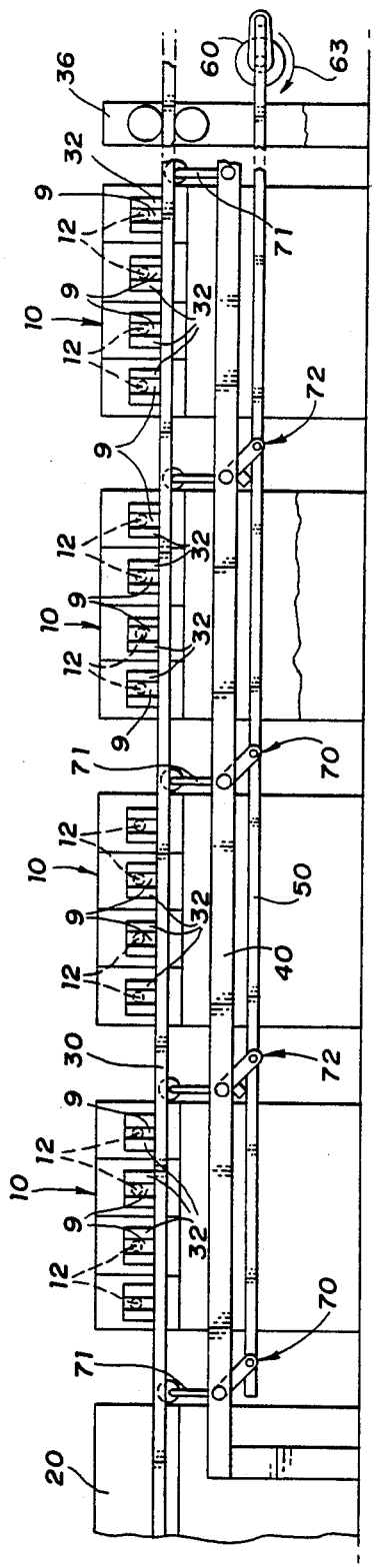

Referring to FIGS. 1 and 2, the improved piston milling machine 7 of the present invention has a plurality of work stations 10 in tandem with one another.

Each work station 10 has a plurality of rotating milling tool heads 12. The rotative axes 14 of the tool heads 12 are generally parallel to one another. At one end of the machine 7, is a presentation machine 20. The presentation machine 20 takes the piston 9 castings and places them on a transfer bar 30.

The transfer bar allows the pistons to be presented to the tool heads 12 of each work station 10. The transfer bar 30 is an elongated member which is moved along its primary axis 34 by a variable height drive 36. The transfer bar 30 has fixtures 32 for reception of the pistons 9. The primary axis 34 is generally perpendicular to the axes 14 of the tool heads 12.

Underneath and generally parallel with the transfer bar 30 is the frame means 40. The frame 40 includes two elongated parallel beams supported in a fixed position with respect to the work stations 10. Underneath the frame 40 and transfer bar 30, and generally parallel thereto, is the drive bar 50. The drive bar 50 can be either a single elongated piece or a plurality of slightly offset members connected together to make one elongated bar. The drive bar 50 has means 60 to provide it with selected reversible movement along a projected arc 63.

Pivotally connected with the frame 40 and the drive bar 50 is a plurality of lift arm assembles 70. Lift arm 71 is a conventional rigid lift arm.

Referring additionally to FIGS. 3, 4 and 5, the milling machine will typically have two or three breakaway type lift arms 72 spaced along the length of the machine. Each of the breakaway lift arms 72 has an upper portion 80 relatively contacting and supporting the transfer bar 30. At an end of the upper portion adjacent to the transfer bar 30, there is a rotatively mounted roller 82 to support the transfer bar 30. The upper portion 80 is pivotally connected to the frame along a first pivotal axis 75.

Fixably connected with the upper portion 80 and projecting generally underneath the frame 40 is a stud arm 120. The stud arm 120 is pivotally joined to the frame coaxially with the first axis 75.

Coaxially pivotally connected along the first axis 75 to the frame 40 is a lower portion 90. The lower portion 90 has two parallel members 91 and 92 forming a slot 93 for reception of the stud arm 120. The lower member 90 also has a section 94 for making contact with the stud arm 120.

Fixably connected on the lower portion 90 is a spring cage 102. The spring cage 102 is made to hold two heavy duty biasing springs 100. The springs 100 urge the stud arm 120 into contact with the lower portion 90 contact section 94. A set screw 114 is provided in the stud arm 120 to set the position of contact of the stud arm 120 with the section 94 of lower portion 90 to adjust for the various machine tolerances.

The lower member has connected thereto an indicator means 110 comprised of a proximity sensor. Threadably connected with the stud arm 120 is a set screw 111 which makes contact with the proximity sensor 110. Any movement of the stud arm 120 away from the lower portion 90 will activate the proximity sensor 110 to signal for cessation of operation of the milling machine 7.

In operation, the transfer bar 30 is in a lower position and elevated to position the piston 9 to come into line with the milling tool heads 12. To accomplish the above, the drive 50 bar is selectively driven in one direction causing the lift arm assemblies 70 to rotate and to elevate the transfer bar 30. If the transfer bar 30 is restrained from upward travel by an excessive force, the stud arm 120 will move away from the lower portion 90 against the action of the springs 100. The lower portion 90 and upper portion 80 will rotate towards one another to prevent damage to the lift arm 72. Automatically upon the above occurrence, the proximity sensor 110 will sense the separation of the stud arm 120 from the lower portion 90 and signal the machine 7 to stop. It has been found that ideally the springs 100 should be able to retain the stud arm 120 to the lower portion 90 when the lift arm 72 experiences an acceleration more than 1 g (with the transfer bar 30 unrestrained). The spring 100 should not retain the stud arm 120 to the lower portion 90 when the lift arm 72 experiences an acceleration of 2 g.

While an embodiment of the present invention has been explained, it will be readily apparent to those skilled in the art with the various modifications which can be made to the present invention without departing from the spirit and scope of this application, as it is encompassed by the following claims.

The embodiments of the invention in which an exclusive property or privilege is claimed are defined as follows:

1. An improved multiple piston milling machine with a plurality of work stations in tandem with one another, each said station having a plurality of rotating milling tool heads with rotative axes parallel with one another, said machine in combination comprising;

an elongated transfer bar with a primary axis generally perpendicular to said axes of said tool heads for accepting a plurality of said pistons, said transfer bar being movable along the primary axis of said transfer bar;

frame means generally parallel with said transfer bar underneath said transfer bar and being fixed with respect to said work stations;

a drive bar generally parallel with said transfer bar and underneath said frame means, said drive bar having selective movement along a projected arc; and a lift arm, said lift arm including:

an upper portion relatively contacting and supporting said transfer bar and said upper portion being pivotally connected along a first axis with said frame;

a lower portion pivotally connected with said drive bar and pivotally connected with said frame means coaxially along said first axis; and a stud arm pivotally connected with said fram means coaxially along said first axis, said stud arm being fixedly connected with one of said upper or lower portions and being spring biased into contact with the other of said upper or lower portions whereby movement of said drive bar in a given direction causes said upper portion to elevate said transfer bar unless an excessive force restrains upward travel of said transfer bar whereupon said stud arm moves away from said other portion allowing said upper and lower portions to rotate towards one another.

2. A milling machine as described in claim 1 further including indicator means signaling for the cessation of operations of said milling machine when said upper and lower portions rotate towards one another.

3. A milling machine as described in claim 1 wherein said stud arm is fixably connected with said upper portion and projects within two generally parallel members of said lower portion and contacts said lower portion along an adjustable stop.

4. An improved multiple piston milling machine with a plurality of work stations in tandem with one another, each said work station having a plurality of rotative milling tool heads with rotative axes parallel with one another, said machine in combination comprising;

an elongated transfer bar with a primary axis generally perpendicular to said axis of said tool heads, said transfer bar accepting a plurality of said pistons, said transfer bar being movable along said primary axis of said transfer bar;

an elongated frame generally parallel with said transfer bar underneath said transfer bar, said frame being fixed with respect to said work stations;

a drive bar generally parallel with said transfer bar underneath said frame and said drive bar having selective movement along a projected ar; and a lift arm, said lift arm including:

an upper portion having along an end adjacent to said transfer bar a rotatively mounted roller for supporting said transfer bar and said upper portion being pivotally connected with said frame along a first axis and having a fixably connected stud arm projecting away from said first pivotal axis generally underneath said frame;

a lower portion pivotally connected with said drive bar and pivotally connected with said frame means coaxially along said first axis, said lower portion having a central slot for reception of said stud arm and having attached thereto indicator means for detecting the location of said stud arm with relationship to said lower portion; and adjustable stop means for setting the position of said stud arm in relationship to said lower portion; and biasing springs connected with said lower portion urging said stud arm into a position of contact with said lower portion whereby movement of said drive bar in a given direction of causes said upper portion to elevate said transfer bar unless an excessive force restrains upward travel of said transfer bar whereupon said stud arm moves away from said lower portion allowing said upper and lower portions to rotate towards one another and to activate said indicator means to signal for the cessation of operation of said milling machine.

5. An improved multiple piston milling machine with a plurality of work stations in tandem with one another, each said work station having a plurality of rotative milling tool heads with rotative axes parallel to one another, said machine in combination comprising:

an elongated transfer bar with a primary axis generally perpendicular to said axes of said tool heads, said transfer bar accepting a plurality of said pistons, said transfer bar being movable along said primary axis of said transfer bar;

an elongated frame generally parallel with said transfer bar underneath said transfer bar and being fixed with respect to said work stations;

a drive bar generally prallel with said transfer bar underneath said frame, and said drive bar having selective movement along a projected arc;

and at least two lift arms, each said lift arm including:

an upper portion having along one end a rotatively mounted roller for supporting said transfer bar and said upper portion being pivotally connected with said frame along a first axis and having a fixably connected stud arm projecting away from said first pivotal axis generally underneath said frame;

a lower portion pivotally connected with said drive bar and pivotally connected with said frame coaxially with said first axis, said lower portion having a central slot for reception of said stud arm and having attached thereto indicator means for detecting the location of said stud arm with relationship to said lower portion; and adjustable stop means for setting the position of said stud arm in relationship to said lower portion; and biasing springs connected with said lower portion urging said stud arm into a position of contact with said lower portion whereby movement of said drive bar at or under a 1 "g" acceleration in a given direction causes said upper portion to elevate said transfer bar unless an excessive force restrains upper travel of said transfer bar whereupon said stud arm moves away from said lower portion allowing said upper and lower portions to rotate towards one another and to activate said indicator means to signal for the cessation of said milling machine.

* * * * *